United States Patent [19]

Summers

[11] Patent Number: 5,485,893
[45] Date of Patent: Jan. 23, 1996

[54] VEHICLE

[76] Inventor: Thomas W. Summers, 757 Logan St., Louisville, Ky. 40204

[21] Appl. No.: 84,428

[22] Filed: Jun. 29, 1993

[51] Int. Cl.[6] .................................................. B62K 21/00
[52] U.S. Cl. ..................... 180/219; 180/134; 280/263; 280/771
[58] Field of Search ................................. 180/219, 223, 180/224, 134–139; 280/263, 270, 274, 281.1, 771, 92

[56] References Cited

U.S. PATENT DOCUMENTS

| | | | |
|---|---|---|---|
| Re. 32,681 | 5/1988 | Randolph et al. ................. | 280/261 |
| 496,388 | 5/1893 | Adams . | |
| 509,919 | 12/1893 | Libbey . | |
| 547,441 | 10/1895 | Libbey . | |
| 1,153,800 | 9/1915 | Larkins et al. . | |
| 1,192,515 | 7/1916 | Gibson . | |
| 1,197,526 | 9/1916 | Mesecke . | |
| 1,363,214 | 12/1920 | Alexander, Jr. . | |
| 1,778,143 | 10/1930 | Carlson . | |
| 2,038,843 | 4/1936 | Jones ............................... | 280/92 |
| 2,101,057 | 12/1937 | Fuller . | |
| 2,177,793 | 10/1939 | Taylor . | |
| 2,182,345 | 12/1939 | Mieher . | |
| 3,289,493 | 12/1966 | Church . | |
| 3,340,947 | 9/1967 | Hollinshead et al. . | |
| 3,448,997 | 6/1969 | Kosugi . | |
| 3,746,113 | 7/1973 | Tidwell .......................... | 180/224 |
| 3,800,898 | 4/1974 | Griffin . | |
| 3,905,323 | 9/1975 | Kacere . | |
| 3,977,693 | 8/1976 | Gamaunt ....................... | 280/99 X |
| 4,168,081 | 9/1979 | Gallina ......................... | 180/223 |
| 4,540,189 | 9/1985 | Tanaka . | |
| 4,641,849 | 2/1987 | André ........................... | 180/270 |
| 4,650,021 | 3/1987 | Matsuda et al. . | |
| 4,662,469 | 5/1987 | Matsuda et al. . | |
| 4,666,018 | 5/1987 | Shibuya . | |
| 4,685,694 | 8/1987 | Kouyama . | |
| 4,712,638 | 12/1987 | Kawaguchi et al. . | |
| 4,721,179 | 1/1988 | Yamaguchi et al. . | |
| 4,880,043 | 11/1989 | Decima et al. . | |
| 4,903,790 | 2/1990 | Horiike et al. . | |
| 4,917,209 | 4/1990 | Horiike et al. . | |
| 5,042,608 | 8/1991 | Horiike et al. . | |
| 5,076,388 | 12/1991 | Horiike et al. . | |

FOREIGN PATENT DOCUMENTS

| | | | |
|---|---|---|---|
| 117016 | 8/1899 | Germany . | |
| 3727771 | 3/1989 | Germany . | |
| 4027643 | 3/1992 | Germany . | |
| 0014990 | 1/1990 | Japan ........................... | 180/219 |
| 3281490 | 12/1991 | Japan ........................... | 180/219 |

OTHER PUBLICATIONS

Some Bicycle Physics, Chapter 9, pp. 171–184.
Sharp, A., Bicycles and Tricycles, The MIT Press, various chapters.
Schwarz, R., "Accident Avoidance Characteristics of Unconventional Motorcycle Configurations", SAE Technical Paper Series, Society of Automotive Engineers, 1979.
Stillbirth of an Industry, pp. 51, 212–217.
"Wizard of the Dome", Great Ideas, but Bad Luck, pp. 76–83.

*Primary Examiner*—Margaret A. Focarino
*Assistant Examiner*—Victor E. Johnson
*Attorney, Agent, or Firm*—Wood, Herron & Evans

[57] ABSTRACT

A single track vehicle includes at least one front drive wheel and one rear steered wheel. A steering mechanism causes the front and rear wheels to substantially track each other during a turn and also causes the center of gravity of the vehicle to be raised during a turn. The steering mechanism further allows simultaneous variance of both the camber angle and turn angle of the rear wheel for even more exact tracking of the front and rear wheels. The steering mechanism further provides for a more linear relationship between the rate of change in the angle of rotation of the steering head of the vehicle and the rate in change of the turn radius of the vehicle. In other aspects, a steering mechanism is provided which allows the operator to maintain a constant width between his hands while turning a vehicle incorporating the steering mechanism. Preferred embodiments of the vehicle are shown in the form of a bicycle and a motorcycle.

29 Claims, 4 Drawing Sheets

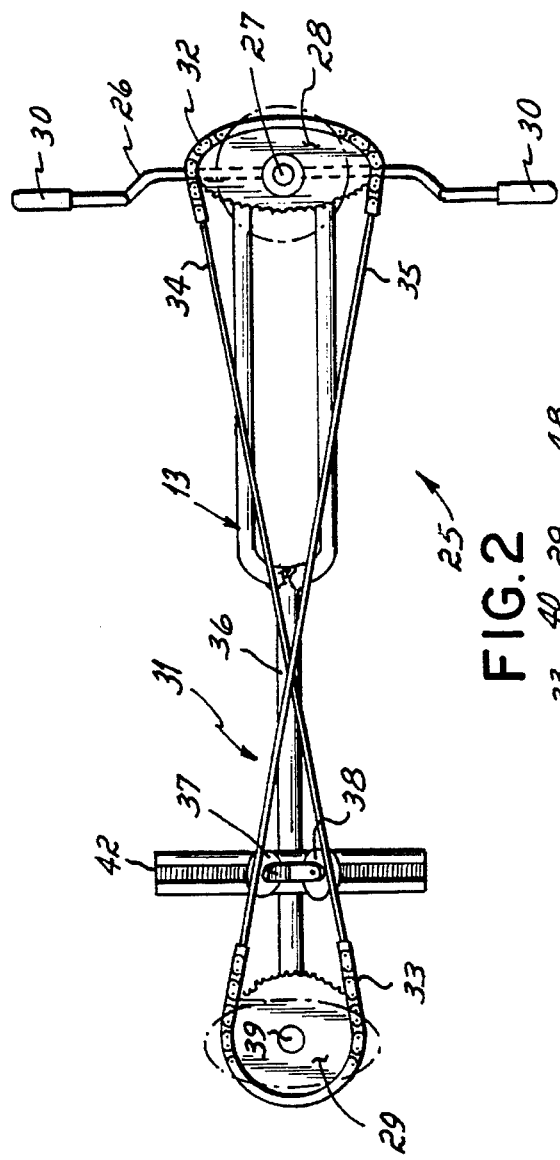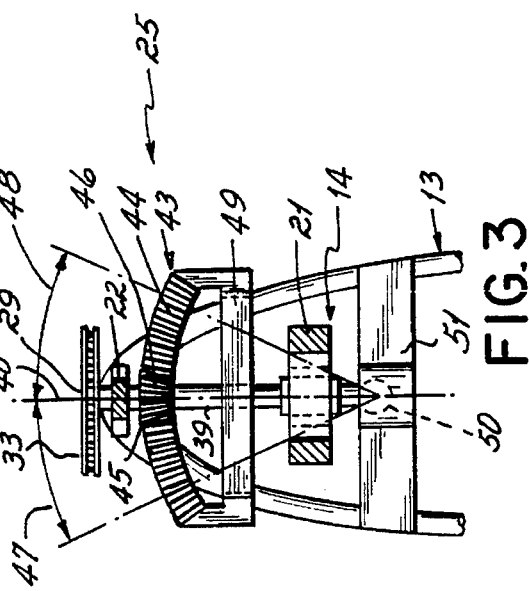

VEHICLE

BACKGROUND OF THE INVENTION

The present invention generally relates to vehicles and more particularly to a front wheel drive, rear steer vehicle such as a motorcycle or bicycle.

Prior vehicles have ranged in design from conventional rear wheel drive, front wheel steer vehicles to unique, limited use front wheel drive, rear wheel steer vehicles and many variations in between. Conventional rear wheel drive, front wheel steer single track (i.e., two wheel) vehicles have inherent limitations stemming from the fact that while the front wheel is attempting to take the vehicle into a turn by being steered in the direction of the turn, the rear drive wheel is attempting to drive the vehicle in a direction generally tangent to the turn since this wheel is locked in that direction.

For this reason, in order to drive the vehicle through a "tight" turn at high speed the operator must allow the rear wheel to slide sideways and outwardly in a direction generally tangent to the turn. As a result, even skilled operators of such vehicles risk losing control of the vehicle during a tight turn.

The alternative to the practice of allowing the rear wheel to slide out during a turn is to reduce the speed of the vehicle during the turn such that the front wheel may be turned more sharply and the operator need not operate the vehicle such that the rear wheel slides out of the turn and control is lost. However, this is an unacceptable alternative for many people and especially when the vehicle is used competitively or where overall speed is otherwise important.

If these difficulties could be overcome, speeds could be increased without any safety disadvantages, or the same speeds maintained but with increased safety margins.

In the area of single track vehicles, numerous designs have addressed the short comings of conventional rear wheel drive, front wheel steer vehicles with regard to their ability to maintain speed and balance while negotiating turns. One proposed solution addressing the problem of turn instability and low turn speeds has been to drive the front wheel and provide a steering mechanism for the rear wheel. In U.S. Pat. Nos. 4,650,021 and 4,662,469, each issued to Matsuda et al., a rear wheel drive motorcycle is disclosed having steering mechanisms for both the front and the rear wheels which simultaneously steer both wheels during a turn. Each of these patents disclose similar, relatively complex linkages for causing simultaneous steering of the front and rear wheels. Also, there is no indication given in either of these patents that the front and rear wheels exactly, or even substantially, track each other during a turn. That is, there is no indication that the rear wheel follows along substantially the same path as the front wheel during a turn. This is important since such tracking allows the power being transmitted to the drive wheel to be most completely used to move the vehicle in the direction of the turn without having to overcome the forces being generated by one wheel moving in a direction other than the direction of the turn.

Other past designs have incorporated a front wheel drive mechanism in combination with front and rear wheel steering mechanisms. In U.S. Pat. No. 5,042,608 to Horiike et al. (Horiike '608), a front wheel drive motorcycle is disclosed which is said to be able to make a turn at high speed. The motorcycle disclosed in Horiike '608 makes use of a relatively complex design which includes a joint shaft for allowing the front frame of the motorcycle to tilt and a steering shaft for allowing the rear wheel to turn. The axis of the joint shaft extends rearwardly and downwardly such that it contacts an imaginary point on the road surface in front of the rear wheel and the axis of the steering shaft extends either in a vertical direction or rearwardly and downwardly such that it contacts an imaginary point on the road surface behind the rear wheel. As the rear wheel banks into a turn, the joint shaft tilts to cause the front wheel to turn simultaneously in the same direction.

In U.S. Pat. No. 5,076,388 to Horiike et al. (Horiike '388) another motorcycle having steering mechanisms for both the front and rear wheels is disclosed. Horiike '388 further discloses that either the front or rear wheel of the vehicle may be driven by a power unit such as an engine. Various embodiments of Horiike '388 are even more complex than those disclosed in Horiike '608 in that the steering mechanisms are driven by motors operated in response to sensors which sense the banking angle of the motorcycle during a turn. Moreover, like the patents issued to Matsuda et al., and described above, there is also no indication in either Horiike '608 or Horiike '388 that their designs cause the front and rear wheels of the vehicle to substantially track each other in a turn.

Another patent, U.S. Pat. No. 2,101,057 issued to Fuller, discloses a front wheel drive rear wheel steer vehicle having a center of gravity which is located forward of the midpoint of the wheel base. In other words, the center of gravity of the vehicle is located closer to the drive wheels than to the steered wheel or wheels. Fuller states that this eliminates the tendency to skid when braking or rounding corners. Fuller does not, however, recognize or disclose the further advantages of having a steering mechanism which allows the front and rear wheels of the vehicle to track each other during a turn. In the Fuller design, the rear wheel can leave the lane in which the front wheels are located during a turn with the result that skidding is, in fact, possible or that energy is otherwise inefficiently used during the turn.

Another disadvantage of prior vehicles relates to the rate of change in the turn radius of the vehicle in response to the manipulation of the steering head. Conventional steering mechanisms are undesirably sensitive to steering inputs in tight radius turns, but less sensitive in larger radius turns. Stated another way, in a conventional steering mechanism the rate of change of the steering head angle varies in a nonlinear fashion with respect to the corresponding rate of change in the turn radius of the vehicle. For example, in such a conventional mechanism, the rate of change in the vehicle's turn radius increases as the steering head angle increases. In tight turns, that increasing ratio of turn radius change to steering head angle change makes the vehicle very sensitive to steering angle changes and thus more difficult to control; smaller steering inputs cause larger turn radius variations than the same steering angle change when the vehicle is moving in a straight line or through a very wide turn. This is most dramatically illustrated in a conventional rear wheel drive, front wheel steer vehicle such as a motorcycle or bicycle. When the steering head is turned to an angle approaching a full "lock" position, i.e., the position at which the front wheel cannot be further turned, very minor changes in the steering head angle cause large changes in the turn radius of the vehicle. This situation is exacerbated when the vehicle is driven over rough terrain, which makes it more difficult for the rider to precisely control steering angle.

Thus, greater sensitivity to steering input, coupled with rider jostling due to terrain, makes the conventionally steered vehicle hard to control. As a result, it would be advantageous to provide a steering mechanism for a vehicle in which changes in the turn angle of the steering head correspond more accurately to changes in the turn radius of the vehicle. In other words, it is desirable to produce a vehicle which is more stable to operate during tight turns.

One further disadvantage of a conventional steering mechanism for a single track vehicle arises from the use of a typical handle bar attachment to a steering head. Considering a conventional bicycle, for example, as the handle bar is turned from its position transverse to the front to rear center line of the bicycle, it becomes more closely aligned with the centerline. When the handle bar is transversely positioned, or when the vehicle is moving straight ahead or is in only a slight turn, it is easier to grasp and control than when turned to a position more aligned with the bicycle's center line. When turned, one end is near the rider, cramping movement, while the other end is forward and away from the rider, requiring the rider to reach out and hold it.

Thus, when the handle bar is turned, as in a tight turn, it presents and awkward situation to the rider and is harder to control. Also, when coupled with the previously mentioned difficulties of increased turn radius sensitivity to steering angle movement, and the difficulties of turn control over rugged terrain, the conventional bicycle handle bar presents significant disadvantages and inherent steering difficulties.

Accordingly, one objective of the present invention has been to provide a front wheel drive, rear wheel steer, vehicle which is able to make turns at higher speeds with the same level of safety as was heretofore possible or at lower speeds with a higher level of safety than was heretofore possible.

It has been another object of the invention to provide a vehicle able to climb hills and to make turns while climbing such hills at greater speed than was heretofore possible by allowing more positive traction between the drive wheel and the road or path being climbed.

It has been still another object of the invention to provide such a vehicle with a steering mechanism which allows the front and rear wheels of, for example, a single track vehicle to follow substantially the same path or to substantially track each other around a turn and thereby cause less slippage and/or friction between the tires of the vehicle and the road and allow more power to be transferred between the tires and the road in the direction of the turn.

It has been yet another object of the invention to provide an improved steering mechanism for a single track vehicle and which reduces sensitivity of turn radius to steering angle changes when the vehicle is in a tight turn.

It has been still a further object of the invention to provide an improved steering mechanism for a vehicle which provides for more positive control of the handle bar for all steering angles.

SUMMARY OF THE INVENTION

To these ends, one preferred embodiment of the present invention comprises a front wheel drive, rear wheel steer single track vehicle having a steering head with a steering head axis which lies in the plane of the rear wheel such that a lower end of the steering head points in a forward direction and an extension of the lower end of the steering head axis intersects with an imaginary point on the road surface which is the approximate midpoint between the contact points of the vehicle's two tires with the road surface. This design effects substantially exact tracking between front and rear wheels of the vehicle. Stated another way, the rear wheel follows the same path as the front wheel around a turn as determined through conventional methods of measurement.

The rear wheel is turned via front handlebars which are connected to the steering head by, for example, a chain and cable system connected between sprockets mounted on both the steering head and the steering shaft of the handlebar.

According to yet another aspect of the present invention, the camber angle of the steered wheel is varied simultaneously with the angle of the steering head. Thus, means are provided for changing the camber angle and the steering angle of the steering head, for example, of a motorcycle or bicycle simultaneously as the operator of the vehicle causes the steering head to rotate. This mechanism provides even more exact tracking between the front and rear wheels of the vehicle.

According to another aspect of the present invention, at least one of these sprockets is elliptically shaped such that a substantially or more linear relationship exists between the change in angle of the steering head and the change in turn radius of the vehicle. Ideally, such a steering mechanism would produce a linear relationship between the rate of change in the turn angle of the steering head and the rate of change in the turn angle of the vehicle. Thus, for example, a 10% change in the turn angle of the steering head would result in a 10% change in the turn radius of the vehicle. Accordingly, when the vehicle is in a tight turn a change in steering head angle will result in a turn radius change of about the same magnitude as a turn radius change responsive to a similar steering angle change when the vehicle is in a wide turn.

Finally, according to yet another aspect of the present invention, an improved steering means are provided for allowing consistent handle bar control by a vehicle operator through maintaining a constant distance between his hands and the centerline of the vehicle as he grips the handlebar of the vehicle during a turn. As mentioned above, another aspect of the invention includes a steering mechanism for a vehicle which allows the operator to maintain a constant width between his hands during a turn.

The design of this steering mechanism incorporates a rigidly fixed handlebar having pivotally mounted grip portions at each end thereof interlinked with the steer head through a series of linkage members. These linkage members cause the steering head angle to change as the operator changes the angle of the outer grip portions of the handlebar. Since the handlebar grip portions are the only portions of the handlebar which pivot during a turn, the operator's hands will remain at a substantially constant width from the vehicle's center line during the turn. They also remain at a substantially constant distance from the operator's body; he is not cramped, nor does he have to reach out to hold onto a forwardly extending end of the bar. This steering mechanism has been found to be especially advantageous on conventional front wheel steer, rear wheel drive bicycles such as "mountain bikes" and is therefore shown and described below as being incorporated on the same. However it will be appreciated that this steering mechanism may be easily incorporated into any of the front wheel drive, rear wheel steer vehicles described herein. It is also suitable for use on conventional front wheel steer vehicles such as bicycles or motorcycles.

It will be appreciated that the steering head, and particularly its location on the vehicle and its angle of inclination with respect to the wheels of the vehicle, causes the front and rear wheels of the vehicle to substantially track each other during a turn.

Moreover, this orientation causes the center of gravity of the vehicle to be raised by centrifugal force during a turn, storing potential energy which becomes kinetic energy useful when exiting the turn.

It will further be understood that the features of the present invention may be easily incorporated into vehicles other than single track vehicles wherein the location and angle of the steering head of the vehicle causes the front and rear wheels to follow at least substantially the same path around a turn. Since the front and rear wheels of the vehicle follow at least substantially the same path around the turn, there is less slippage and/or friction between the tires and the road and therefore more power available to be transferred between the tires and road in the direction of the turn. In other words, as the front wheel of the front wheel drive vehicle is pulling the vehicle into and around a turn, the rear steered wheel is not fighting the turn by tracking a path which is different than the path of the front drive wheel. Instead, the rear wheel is following exactly the same path as that of the front drive wheel and is therefore not expending energy propelling the vehicle in a direction other than the direction of the turn.

Furthermore, since the preferred steering mechanism uses centrifugal force to raise the center of gravity of the vehicle during the turn, potential energy is created during the turn which is then converted to kinetic energy as the center of gravity lowers when the vehicle comes out of the turn. This kinetic energy serves to increase the speed of or power available to the vehicle as it comes out of the turn. The steering mechanism thus makes use of energy which is otherwise wasted by skidding or slowing down during the turn.

Accordingly, the invention provides at least a single track vehicle which can be driven through turns at higher speeds but with the same safety factor as conventional single track vehicles, or at the same speeds but with increased safety. Power is applied to a traction surface substantially in the turn direction without skidding or scuffing as the front and rear tires track the same path.

Stability is enhanced in tight turns as steering angle inputs result in substantially the same turn radius changes throughout the entire steering angle range.

Finally, stability and control is enhanced by the pivoted grips of a handle bar which do not cramp or contort the rider, but instead allow him to maintain his body square with the vehicle's center line during ever tight turns, without interference by a near grip or having to reach for the far grip of a conventional handle bar.

Other objects and advantages will become readily apparent to those of ordinary skill in the art from the following detailed description taken in conjunction with the accompanying drawings.

BRIEF DESCRIPTION OF THE DRAWINGS

FIG. 2 is a top view taken along lines 2—2 of FIG. 1 but eliminating parts of the motorcycle for clarity to show a portion of the steering mechanism for turning the rear wheel;

FIG. 3 is a cross sectional view taken along lines 3—3 of FIG. 1 and showing another portion of the steering mechanism used to turn and bank the rear wheel or change its camber;

DETAILED DESCRIPTION OF THE PREFERRED EMBODIMENTS

Figure 1:
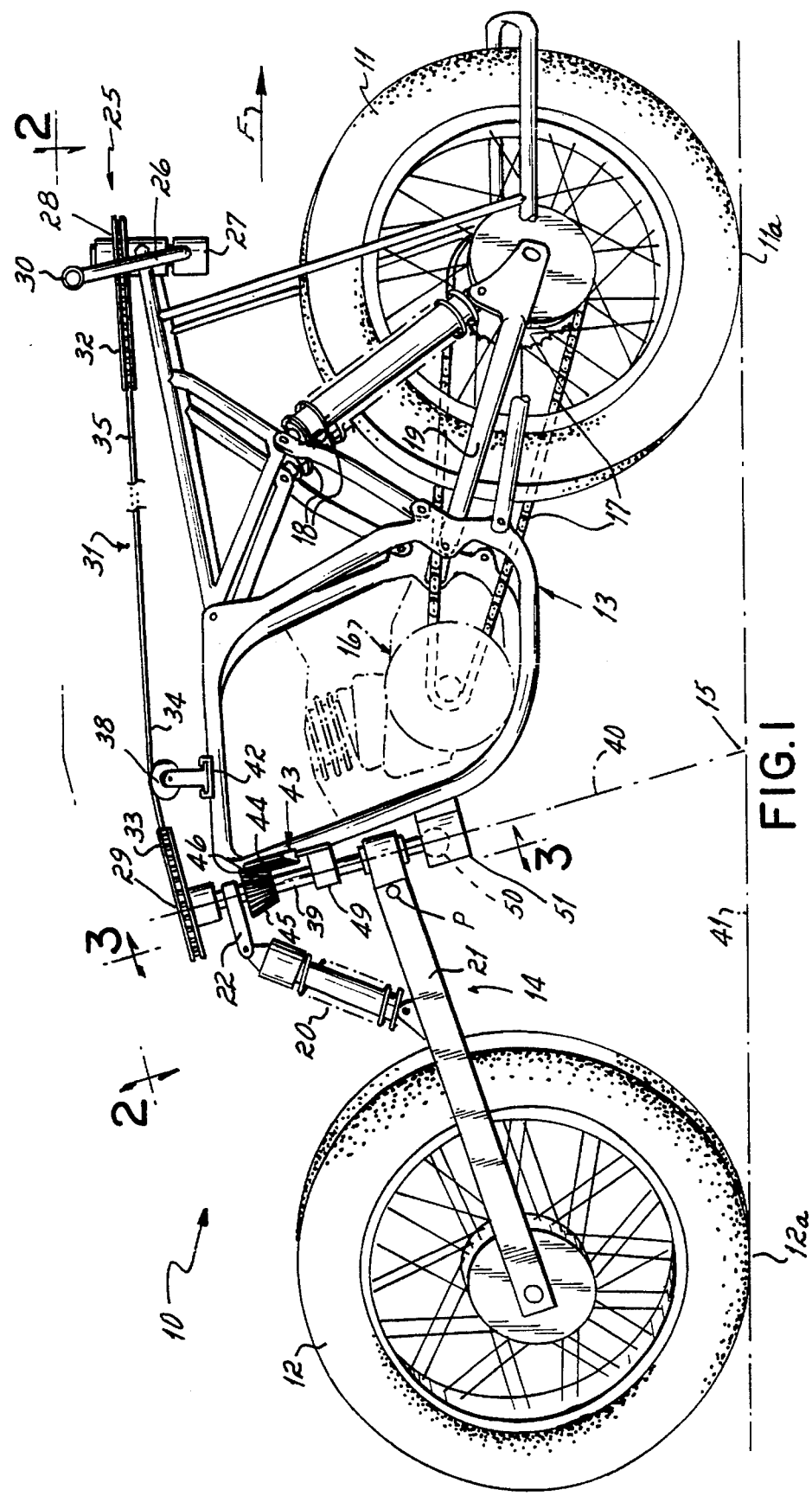
FIG. 1 is a side perspective view of a motorcycle constructed according to one preferred embodiment of the invention.

Referring first to FIG. 1, one preferred embodiment of the present invention takes the form of a single track, two wheel vehicle or motorcycle 10. As used herein, the term "single track" generally refers to a two-wheeled vehicle having one wheel mounted generally behind the other. As shown in FIG. 1, the frame 13 and engine 16 may be oriented in a reversed direction from conventional motorcycles, with the motor running oppositely to drive the vehicle 10 forwardly in the direction of arrow "F", or other frame and engine configurations, within the parameters described herein, could be used.

The motorcycle 10 is shown with the gas tank, seat, fairings and various other portions thereof removed for clarity and includes a front wheel 11 and rear wheel 12. The front wheel 11 is attached to a front frame 13 and the rear wheel 12 is attached to a rear frame 14. Front frame 13 preferably includes the support structure for supporting the vehicle operator, including a seat, which has been removed for clarity as just mentioned but generally as shown in the bicycle embodiment in FIG. 6 and described below. A drive mechanism is incorporated into the motorcycle 10 in the form of an engine 16 which drives the front wheel 11 through a conventional chain drive 17 to propel the motorcycle 10 in a forward direction as indicated by the arrow "F". Of course, other drive systems may be substituted for the chain drive 17 shown in FIG. 1. Such substitute drive systems may include, for example, belt, hydraulic or shaft drive systems.

The front suspension of the motorcycle 10 includes a pair of shock absorbers 18 pivotally attached to the front swing arm 19 and the front frame 13. The rear suspension consists of, for example, a single shock absorber 20 which is pivotally mounted at a lower end to the rear swing arm 21 of the rear frame 14 and pivotally mounted at an upper end to a shock absorber mounting bracket 22 which extends off the steering head 39, described in detail below. Swing arm 21 is pivoted at pivot "P" (FIG. 1) to allow the swing arm 21 and rear wheel 12 to move up and down. It will be appreciated that a multiple link rear shock suspension could be used.

As shown in FIGS. 1 and 2, the steering mechanism 25 includes a handlebar 26 which, in this embodiment, is directly coupled to and turns a steering shaft 27 which in turn rotates a front sprocket 28. The handlebar 26 is rotated by the vehicle operator using conventional outer grip portions 30. The front sprocket 28 is preferably elliptically shaped so as to effect a substantially linear relationship between the turn angle of the steering shaft 27 and the turn radius of the motorcycle 10 as the steering shaft is turned. Thus, preferably, a given change in steering shaft angle will generate a predetermined turn radius change throughout the range of available steering shaft movement. For example, a 5° change in steering shaft angle will produce a linear change in the turning radius whether the 5° change is made from the neutral or no turn position of the steering shaft or is made toward the end of the full available deflection of the shaft from neutral. Thus stated in another way, for example, the rate of change in the turn radius relative to steering shaft rotation is substantially a constant, i.e., the ratio of turn radius change to steering shaft rotation is substantially a constant.

Although the front sprocket 28 is shown to be elliptical in FIG. 2, either the front sprocket 28, the rear sprocket 29, or both sprockets 28, 29 may be elliptically shaped (such as the elliptical sprocket shown in dotted lines in FIG. 2) to obtain a more linear steering relationship as described above. If both sprockets 28, 29 are elliptically shaped, then their major axes will be oriented preferably perpendicular to one another. The elliptical sprocket 28 is preferably shaped such that the ratio of its major diameter to its minor diameter is approximately 2:1. Of course, the front sprocket could be circularly shaped (as shown in dotted lines in FIG. 2) with the rear sprocket elliptically shaped. Both sprockets could be circular, of course, but without the benefit of the steering ratios noted herein. It will be appreciated that the particular configuration of the sprockets may be selected to provide variations between the change in the steering shaft angle and the resulting turning radius such that the ratio between them is more linear than conventional two wheeled vehicles and is preferably substantially linear.

The front sprocket 28 is operatively connected to a rear sprocket 29 by a chain and cable system 31 which preferably includes a front chain 32 which engages the front sprocket 28, a rear chain 33 which engages the rear sprocket 29 and intermediate crossing cables 34, 35 which connect respective ends of the front and rear chains 32, 33. The two intermediate cables 34, 35 cross at an intermediate point 36 such that the effects of turning the handlebar 26 are the same as in a conventional motorcycle. That is, a eft hand turn of the handlebar 26 will result in a left hand turn of the motorcycle 10 and vice versa. The cables 34, 35 are preferably support,;d above the front frame 13 by two spring loaded pulleys 37, 38 which r de in a track 42 rigidly secured to the frame 13. By way of this design, vertical displacement of the cables 34, 35 caused by movement of the steering head 39 in the direction of the arrows 47, 48 (FIG. 3) is accounted for by the extension and compression of one or more springs (not shown) which support each pulley 37, 38. Simultaneous horizontal movement of the cables 34, 35 during a turn is accounted for by movement of the pulleys along the track 42.

As shown in FIG. 1, the steering head 39 is disposed about axis 40 between the front frame 13 and the rear frame 14. In the preferred embodiment, the steering head 39 is rigidly attached to the upper end of the rear sprocket 29 such that rotation of the rear sprocket 29 through angular rotation of the handlebar 26 will cause the steering head 39 to turn. A lower portion of the steering head 39 is rigidly secured to a forward end of the rear swing arm 21. With the motorcycle 10 placed in an upright position and the front wheel 11 in line with the rear wheel 12, the steering head 39 is located rearward of the center point of the wheel base with the lower end of the axis of rotation 40 of the steering head 39 angled forwardly toward the center of the wheel base as further described in detail below with reference to FIGS. 4 and 4A.

As best shown in FIG. 3, the steering mechanism 25 further includes a means for varying the camber of the rear frame 14 and rear wheel 12 simultaneously with the change in the turn angle of the rear wheel 12. This produces a more exact equivalency of turn radius for each wheel so that each tracks the same path with no slip or loss of energy due to the geometric configuration of the dynamically turning wheels. As used herein, the terms "bank" and "camber" refer to the angular motion represented by the extended arrows 47, 48 in FIG. 3. Thus, the steering mechanism 25 further includes a gear ring or curved rack member 43 having a series of gear teeth 44 disposed thereon and adapted to mate with a pinion member 45 having gear teeth 46 which mate with teeth 44. The gear ring or curved rack member 43 is rigidly secured to a rear portion of the front frame 13, for example, by any appropriate means such as welding or bolting. The pinion 45 is rigidly mounted on the steering head 39 such that it rotates therewith during a turn. Thus, as the steering head 39 rotates through rotation of the handlebar 26 and front and rear sprockets 28, 29, the pinion 45 follows the gear ring or curved rack member 43 so as to vary the camber angle of the rear frame 14 and rear wheel 12 as shown by arrows 47, 48, depending on the direction of the turn. It will also be noted that the lower extended end of axis 40 will traverse laterally as the head 39 is "banked" or "cambered".

The gear ring or curved rack member 43 includes a lower extension or strap portion 49 which supports an outside surface of the steering head 39 and holds the pinion 45 against the gear ring or curved rack member 43. A captive ball joint 50 is attached at the lower end of the steering head 39 and is mounted in a suitable ball joint support member 51 which is rigidly secured to a lower rear portion of the front frame 13. The rear swing arm 21 is rigidly secured to the steering head 39 at a location which is intermediate the lower extension or strap portion 49 of the gear ring or curved rack member 43 and the ball joint 50. As mentioned previously, the rear shock absorber 20 is mounted to the steering head 39 by way of a shock absorber mounting bracket 22 located intermediate the rear sprocket 29 and the pinion 45. The rear shock absorber mounting bracket 22 is rigidly secured to the steering head 39 such that it too will rotate with the steering head 39 during a turn.

Figure 6:
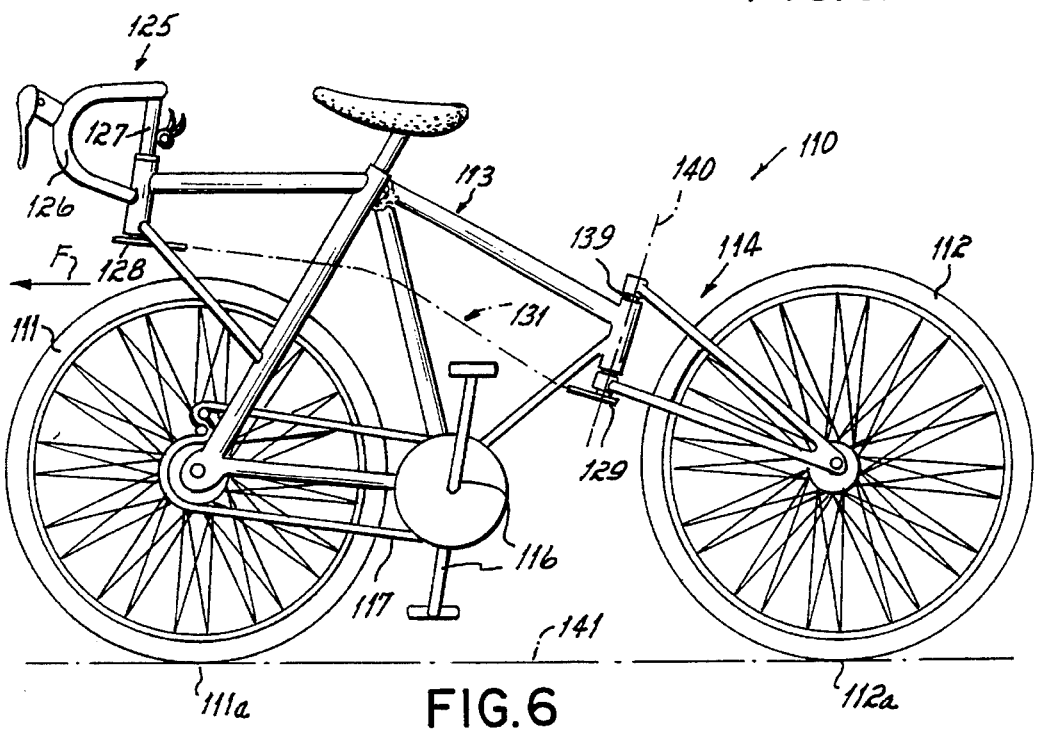
FIG. 6 is a side view of a bicycle constructed according to a further embodiment of the invention; and, FIG. 7 is a broken top prospective view of a front wheel steer, rear wheel drive bicycle having a steering mechanism constructed according to a third embodiment of the invention.

Turning briefly to FIG. 6, wherein elements in FIG. 6 which are common to elements of FIG. 1 are denoted by like reference numerals except that they are shown in "100" series form, another preferred embodiment of the present invention takes the form of a bicycle 110. The bicycle 110 includes a front drive wheel 111 and rear steered wheel 112. The front wheel 111 is attached to a front frame 113 and the rear wheel 112 is attached to a rear frame 114. Front frame 113 comprises support structure for supporting the rider or operator and this support structure includes a seat 113a for the operator. Also attached to the front frame 113 is a drive mechanism taking the form of pedals 116 operatively connected to the front wheel 111 by way of a drive chain 117. The pedals 116 may be operated by the rider in a conventional manner to propel the bicycle 110 in a forward direction indicated by the arrow "F".

The steering mechanism 125 of the bicycle 110 includes a conventional handlebar 126 having a steering shaft 127. Like the motorcycle 10 shown in FIG. 1, the bicycle 110 also includes a front steering sprocket 128 connected to the steering shaft 127 at a lower end thereof and a rear steering sprocket 129 attached to a steering head 139 located between the front frame 113 and the rear frame 114. The front sprocket 128 and rear sprocket 129 are connected by a cable system 131 which may, for example, be identical to the cable and chain system of the motorcycle 10 shown in FIG. 1. The interconnecting cables may be routed through appropriate pulleys or guides (not shown). Upper and lower ends of the steering head 139 are rigidly secured to the rear frame 114 of the bicycle 110 such that rotation of the steering head 139, which results from rotation of the steering shaft 127 and resulting rotation of the rear sprocket 129, causes the rear frame 114 and rear wheel 112 to turn accordingly therewith. The steering head 139 is rotatably mounted within a cylindrical steering head housing 142 rigidly connected at a rear portion of the front frame 113. The steering head 139 rotates about its longitudinal axis 140.

As with the motorcycle 10 shown in FIG. 1, the lower end of the steering head axis 140 preferably projects forwardly onto an imaginary point on the road surface 141 which is preferably the exact center point between the respective road contact points 111a, 112a of the front wheel 111 and rear wheel 112. This design has been shown through conventional measurement techniques to almost effect perfect tracking between the front and rear wheels 111, 112 during a turn. It will be appreciated that in order to effect perfect tracking between the front and rear wheels 111, 112 of the bicycle 110, a camber adjust mechanism as shown in FIG. 3 may be incorporated into the design of the steering head 139.

Figure 4:
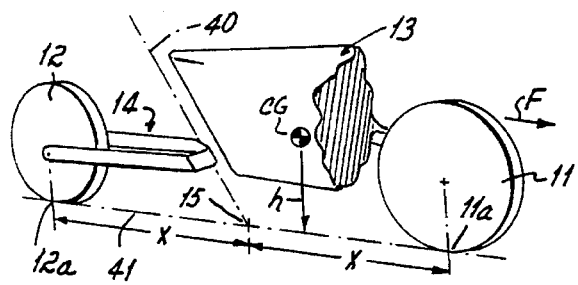
FIG. 4 is a schematic perspective illustration of a single track vehicle constructed according to a preferred embodiment of the invention showing the steering axis extending downwardly and forwardly and showing the relative locations of the contact points of the front and rear wheels on a road surface, the intersection of the steering axis on the road surface at center point between these two contact points and, the center of gravity of the vehicle.
Figure 4A:
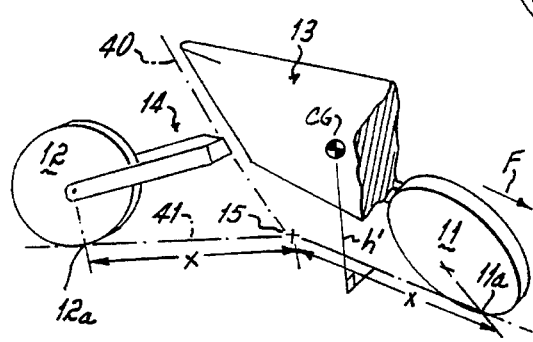
FIG. 4A shows the vehicle of FIG. 4 executing a turn and illustrates the change in the height of the center of gravity from the road surface.

Another desirable effect of this design is shown and described below with reference to FIGS. 4, 4A, 5 and 5A. FIGS. 4 & 4A show the effects of the steering angle and location of the steering head of a vehicle constructed according to a preferred embodiment of the present invention. It will be appreciated that although FIGS. 4 & 4A will be described in reference to the motorcycle embodiment shown in FIG. 1, these desirable effects are equally applicable to the bicycle shown in FIG. 6 or, for that matter, any multi-wheeled vehicle constructed in accordance with the teachings of the present invention.

FIG. 4 diagrammatically illustrates the motorcycle 10 with the front and rear wheels 11, 12 resting on a level road surface 41 and both shown to be vertically oriented in a straight ahead forward direction indicated by the arrow "F". The front frame 13 and rear frame 14 are shown with the steering head axis 40 located therebetween and extending downwardly and forwardly through the center point 15 on the road surface 41 between the front and rear wheel contact points 11a, 12a.

The wheel base of the vehicle 10 is defined as the distance between the contact points 11a, 12a. Stated in another way, the wheel base of vehicle 10 is the distance between the respective intersections of vertical projections from each wheel (11, 12) axis to surface 41.

The center of gravity "CG" of the motorcycle 10 is shown in FIG. 4, for example, in its ideal location, i.e., located forward of the center point 15. In this way, the center of gravity "CG" is closer to the drive or front wheel 11 than to the steered or rear wheel 12. Thus, as shown in FIG. 4, the contact points 11a, 12a of the front and rear wheels 11, 12 are located an equal distance "x" from the center point 15. Also, the center of gravity "CG" is located a vertical distance or height "h" from the road surface 41.

It will be appreciated that references herein to the position of the center of gravity refer to its longitudinal position as measured along the wheel base, i.e., line 41 (FIG. 4).

As shown in FIG. 4A, when the rear frame 14 and rear wheel 12 of the motorcycle 10 are turned, the center of gravity "CG" is raised to a greater height h' from the road surface 41. By raising the center of gravity "CG" of the motorcycle 10 during a turn, potential energy is created during the turn. This potential energy is then converted to kinetic energy as the center of gravity "CG" is lowered when the motorcycle 10 comes out of the turn and returns to the position shown in FIG. 4. This transfer of energy to the motorcycle 10 as it comes out of a turn increases the speed and/or power available to the motorcycle 10.

The location of the center of gravity along the vehicle 10 can be important to the stability of the vehicle. For example, with respect to FIG. 4, if the "CG" of the vehicle unloaded is located a distance about 41% of the wheel base rearwardly from the front wheel contact point 11a (measured along line 41 ), and loaded with a rider at about 46% of the wheel base rearwardly, the vehicle may be reliable but unstable at slower speeds. When this "CG" of the unloaded vehicle is moved forwardly, for example, to a position about 39% of the wheel base (rearwardly from the front wheel contact point 11a) and with a rider mounted forwardly to bring the "CG" to about 36%, the vehicle becomes more stable at slower speeds than when the "CG" is at the 41% of wheel base position.

Figure 5:
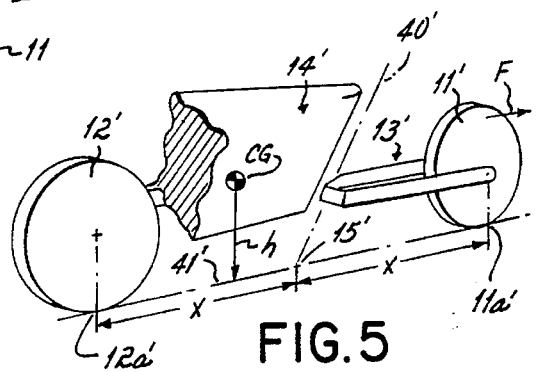
FIG. 5 is a schematic perspective illustration of a single track vehicle construction according to another embodiment of the invention showing the steering axis extending downwardly and rearwardly and showing the relative locations of the contact points of the front and rear wheels on a road surface, the intersection of the steering axis on the road surface at the center point between these two contacts points and, the center of gravity of the vehicle.

FIG. 5 diagrammatically illustrates an alternative embodiment of a single track vehicle 10' with the steered front and driven rear wheels 11', 12' resting on a level road surface 41 and both shown to be vertically oriented in a straight ahead forward direction indicated by the arrow "F". The front frame 13' and rear frame 14' are shown with the axis 40' of the steering head located therebetween and extending downwardly and rearwardly through the center point 15' on the road surface 41 between the front and rear wheel contact points 11a', 12a' (i.e., center point 15' is the center of the wheel base). In this alternative embodiment, the center of gravity "CG" of the motorcycle 10' is shown in its ideal location, i.e., located rearward of the center point 15 and closer to the drive or rear wheel 12' than to the front or steered wheel 11'. As shown in FIG. 5, the contact points 11a', 12a' of the front and rear wheels 11', 12' are located an equal distance "x" from the center point 15'. Also, the center of gravity "CG" is located a vertical distance or height "h" from the road surface 41.

Figure 5A:
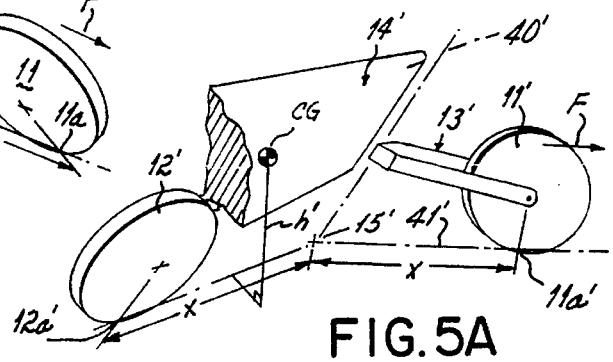
FIG. 5A shows the vehicle of FIG. 5 executing a turn and illustrates the change in the height of the center of gravity from the road surface.

As shown in FIG. 5A, when the front frame 13' and front wheel 11' of the vehicle 10' are turned, the center of gravity "CG" is raised from an initial height h' (FIG. 5) to a greater height h' from the road surface 41. In a manner similar to the vehicle 10 shown in FIG. 4 and A, by raising the center of gravity "CG" of the vehicle 10', potential energy is created during the turn. This potential energy is then converted to kinetic energy as the center of gravity "CG" is lowered when the vehicle 10' comes out of the turn and returns to the position shown in FIG. 5. This transfer of energy to the vehicle 10' as it comes of a turn, increases the speed or power available to the vehicle 10'.

It should be noted that the essential difference between the embodiment of FIGS. 4 and 4A and the embodiment of FIGS. 5 and 5A is that the embodiment of FIGS. 4 and 4A is a rear steer vehicle having a steering axis 40 which extends downwardly in a forward direction while the embodiment shown in FIG. 5 and 5A is a front wheel steer vehicle having a steering axis 40' extending downwardly in a rearward direction. In each case, the respective steering axes 40, 40' extend through the respective wheel base center points 15, 15'. The orientation of the steering axes 40, 40' in each of these embodiments results in a vehicle in which the front and rear wheels substantially track each other during a turn and in which the center of gravity of the vehicle is raised during a turn and lowered as the vehicle comes out of the turn. Thus, it will be appreciated that the motorcycle 10 shown in FIG. 1 and the bicycle 110 shown in FIG. 6 may be easily modified such that the steered wheel is the front wheel and the steering axis thus extends downwardly in a rearward direction. As shown in FIGS. 5 and 5A, this modification still advantageously results in a vehicle having front and rear wheels which substantially track each other during a turn and having a center of gravity which is raised during a turn. It should also be appreciated that the embodiment of FIGS. 5 and 5A may also be provided with a camber changing mounting similar to that of FIG. 3, where desired.

Figure 7:
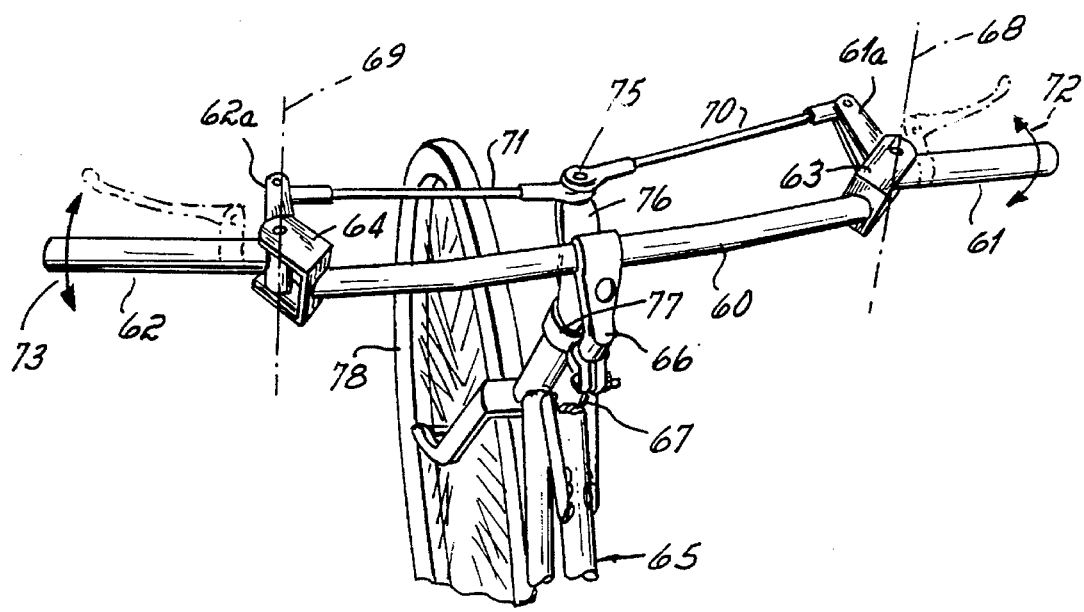
Figure 8:
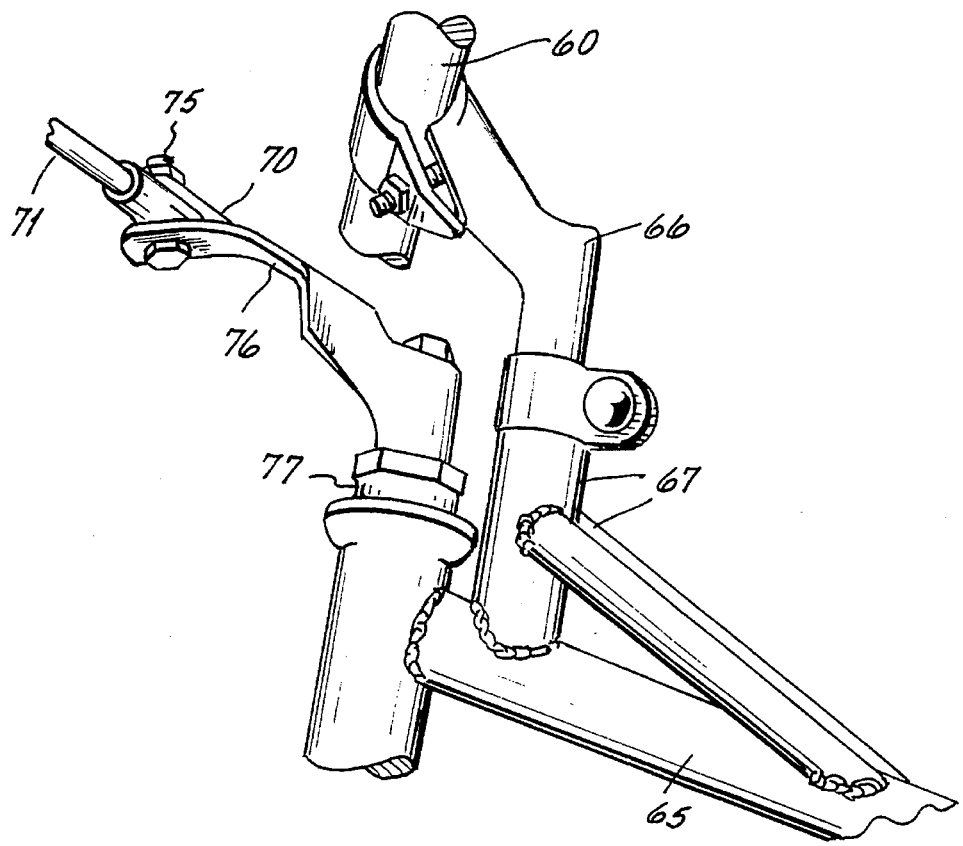
FIG. 8 is an enlarged side view of the steering mechanism of FIG. 7 which more specifically shows the connection between the steering handle and the bicycle frame and the steering linkage to the steering head shaft.

Turning now to FIGS. 7 & 8, an alternative manner of turning the steering shaft of a vehicle includes a handlebar 60 having grips 61, 62 disposed at opposite ends thereof. The grips 61, 62 are pivotally mounted to suitable brackets 63, 64 rigidly attached to opposite ends of the handlebar 60. The grips 61, 62 pivot about respective axes 68, 69 in the direction of arrows 72, 73.

As best illustrated in FIG. 8, the handlebar 60 is rigidly secured to the frame 65 of the vehicle by way of a height adjustable bracket 66 and a subframe 67. Thus, it will be appreciated that the handlebar 60 is not adapted to rotate but simply serves as a support for the two pivotal grips 61, 62.

Turning back to FIG. 7, the grips 61, 62 include extension or leg portions 61a, 62a at inner ends of the respective grips 61, 62. The extension or leg portions 61a, 62a extend at approximately right angles to the respective grips 61, 62. Two linkage members 70, 71 are pivotally attached at one end to outer ends of the respective extension portions 61a, 62a of each grip 61, 62. The inner ends of each of these linkage members 70, 71 are attached to one another at a pivot point 75 as well as to a linkage support bracket 76 which, in turn, is rigidly secured to the steering shaft 77 (FIG. 8). In the case of a conventional rear wheel drive/front wheel steer motorcycle or bicycle as shown in FIG. 7, the steering shaft 77 is also the steering head of the front wheel. The steering mechanism of FIGS. 7 & 8 has been found to be especially desirable when used on conventional rear wheel drive/front wheel steer bicycles, such as "mountain bikes". Therefore, the steering shaft/steering head 77 has been shown attached to a front steerable wheel 78. It will be appreciated that this alternative steering mechanism may also easily be incorporated into the front wheel drive, rear wheel steer vehicles shown in FIGS. 1–6. To incorporate the steering mechanism of FIGS. 7 & 8 into vehicles such as those shown in FIGS. 1 and 6, the steering shaft 77 would simply be operatively connected to a rear steering head by way of a suitable cable system as shown in FIGS. 1 or 6 or by some other hydraulic or pneumatic system, for example.

Accordingly, the present invention significantly improves the riding characteristics of a vehicle in several ways. First, through the specific location and angle of the steering head, the front and rear wheels of the vehicle follow substantially the same path during a turn. This results in substantially more of the energy produced by the vehicle being used during the turn to propel the vehicle in the direction of the turn as opposed to directions other than the direction of the turn. Second, the steering mechanism constructed according to the preferred embodiment of the present invention also effects simultaneous change in the camber angle with the turn angle of the steered wheel or wheels of the vehicle. This results in a vehicle wherein front and rear wheels more exactly track each other during a turn. Third, the steering mechanism of the present invention raises the center of gravity of a vehicle during a turn to thereby create potential energy which is transformed into kinetic energy and used to increase the power available as the vehicle comes out of the turn. Fourth, a system has been shown and described which effects a more linear relationship between the turn angle of the steering shaft of the vehicle and the turn radius of the vehicle. Thus, rotation of the steering shaft is more accurately reflected in the change it produces in the turn radius of the vehicle, and undesirably gross turn radius changes are not produced for small steering radius changes. Fifth, a preferred form of the steering mechanism of the present invention allows the vehicle operator to maintain a constant width between his hands and the vehicle's center line during a turn to thereby maintain better control of the vehicle and balance during the turn.

Although preferred embodiments of the invention have been described above, numerous modifications will become readily apparent to those of ordinary skill in the art without departing from the scope of the invention. For example, although only single track vehicles in the form of a motorcycle and a bicycle have been shown and described above, it will be appreciated that the concepts of the present invention are readily adaptable to vehicles having more than two wheels. For example, in a two track four wheel vehicle, the front and corresponding rear wheels would be suspended as described herein with such suspension being articulated to the vehicle frame. Also, the specific means for causing the steering head to rotate may be substituted with hydraulic or pneumatic systems, gear systems, chain and sprocket systems, or belt and pulley systems other than the systems shown and described above.

Other modifications will become readily apparent to those of ordinary skill without departing from the scope of the invention and applicant intends to be bound only by the claims appended hereto.

I claim:

1. A two wheel single track vehicle having a center of gravity and comprising:

a front frame having support structure including a seat for supporting a vehicle operator thereon;

a rear frame;

a front wheel connected to said front frame and a rear wheel connected to said rear frame;

drive means mounted to said front frame for driving said front wheel; and, a steering mechanism operable from said front frame for turning said rear wheel about a turn axis, said turn axis being defined by a steering head disposed between said front and rear wheels and connecting said front and rear frames and disposed rearward of said center of gravity, wherein said turn axis is inclined in a longitudinal direction extending downwardly and toward said front wheel.

2. The vehicle of claim 1 wherein said vehicle is a two wheel motorcycle and said drive means is an engine.

3. The vehicle of claim 1 wherein said vehicle is a two wheel bicycle and said drive means is a chain and sprocket mechanism operated by foot pedals.

4. The vehicle of claim 1 wherein said axis extends downwardly such that it intersects at substantially a center point on a line extending between the lowest point on said front and rear wheels.

5. The vehicle of claim 4 wherein the center of gravity of said vehicle is located forward of said center point.

6. The vehicle of claim 1 wherein said steering head is further mounted between said front and rear frames for lateral pivoting motion with respect to said front frame to vary the camber angle of said rear wheel as said steering head is rotated about said turn axis.

7. The vehicle of claim 6 wherein said steering head includes a shaft rigidly connected to said rear frame end said steering mechanism further comprises:

first sprocket means attached to said steering head shaft for receiving chain means operatively connected to a steering handle mounted on said front frame whereby pivoting action of at least a portion of said steering handle causes rotation of said first sprocket means and said steering head shaft about said turn axis so as to turn said rear wheel;

ball joint means attached at a lower end of said steering head shaft for allowing said steering head shaft to pivot and thereby change the camber angle of said rear wheel; and, ring and pinion means disposed intermediate said first sprocket means and said ball joint means for translating rotational movement of said steering head shaft into pivoting movement which varies the camber angle of said rear wheel.

8. The vehicle of claim 7 wherein said steering handle is rotatably mounted on said front frame and is operatively connected to said chain means such that rotation of said steering handle causes simultaneous rotation of said first sprocket means and said steering head shaft to turn said rear wheel.

9. The vehicle of claim 8 wherein said steering handle further comprises a midsection pivotally secured to said front frame and handle grips connected to opposite ends of said midsection, said midsection being rigidly connected to second sprocket means which is connected to said chain means such that pivoting movement of said midsection causes simultaneous rotation of said first and second sprocket means and said steering head shaft to turn said rear wheel.

10. The vehicle of claim 9 wherein at least one of said first and second sprocket means has an elliptical shape.

11. The vehicle of claim 10 wherein said elliptically shaped sprocket means has a major diameter to minor diameter ratio of approximately 2:1.

12. A two wheel single track vehicle comprising:

a frame having front and rear portions pivotally connected together by a steering head shaft;

front and rear wheels respectively connected to said front and rear portions of said frame;

drive means mounted to said frame for driving said front wheel;

a rotatable steering shaft connected to the front portion of said frame for steering said rear wheel to cause said vehicle to turn through a turn radius; and, said steering head shaft rigidly connected to said rear portion of said frame and pivotally connected to said front portion of said frame, and first elliptically shaped sprocket means attached to one of said steering shaft and said steering head shaft and second sprocket means attached to the other of said steering shaft and said steering head shaft, each of said first and second sprocket means receiving chain means operatively connected between said steering shaft and said steering head shaft whereby pivoting action of said steering shaft causes rotation of said first and second sprocket means and said steering head shaft to turn said rear wheel.

13. The vehicle of claim 12 further comprising:

ball joint means attached at a lower end of said steering head shaft for allowing said steering head shaft to pivot in a plane transverse to a plane containing said rear wheel to thereby change the camber angle of said rear wheel; and, ring and pinion means connected between said front and rear portions of said frame for translating rotational movement of said steering head shaft into pivoting movement which varies the camber angle of said rear wheel.

14. The vehicle of claim 12 wherein said vehicle is a two wheel vehicle and said drive means comprises an engine.

15. The vehicle of claim 12 wherein said vehicle is a two wheel bicycle and said drive means comprises a chain and sprocket mechanism operated by foot pedals.

16. A two wheel single track vehicle comprising:

a forward frame having support structure including a seat for accommodating a vehicle operator thereon and including a steering mechanism operable by said vehicle operator supported on said forward frame, a rearward frame, said forward and rearward frames pivotal together about a steering axis inclined downwardly and forwardly and disposed rearward of said support structure, a wheel mounted on each frame, each wheel having a lowermost point, said steering axis extending through an intersection point on a line extending between the lowermost points of said wheels and said intersection point being disposed rearward of a center of gravity of said vehicle when said vehicle is standing upright with the wheels in alignment with each other.

17. The vehicle of claim 16 wherein said intersection point is a center point on said line extending between the lowermost points of said wheels.

18. A two wheel single track vehicle comprising:

a frame having first and second frame portions connected to one another by a steering head shaft, said steering head shaft rigidly mounted to said first frame portion and mounted to said second frame portion by a pivot mount which allows rotation of said steering head shaft about a vehicle turn axis and allows angling of said steering head laterally with respect to said second frame portion;

first and second wheels respectively mounted to said first and second frame portions, said first wheel being a steered wheel having both a turn angle and a camber angle;

drive means mounted to said second frame portion for driving said second wheel; and, steering means mounted to said second frame portion for rotating said steering head shaft and for simultaneously angling said steering head shaft laterally with respect to said second frame portion to thereby turn said first wheel through said turn angle and simultaneously vary said camber angle of said first wheel.

19. The vehicle of claim 18 wherein said drive means is an engine.

20. The vehicle of claim 18 further comprising:

first sprocket means attached to said steering head shaft and receiving chain means operatively connected to a steering handle mounted on said second frame portion whereby pivoting action of at least a portion of said steering handle causes rotation of said first sprocket means and said steering head shaft about said turn axis so as to turn said first wheel.

21. The vehicle of claim 20 wherein said pivot mount further comprises:

ball joint means attached at one end of said steering head shaft for allowing said steering head shaft to pivot laterally and thereby change the camber angle of said first wheel; and, ring and pinion means disposed intermediate said first sprocket means and said ball joint means for translating rotational movement of said steering head shaft into simultaneous lateral pivoting movement which varies the camber angle of said first wheel.

22. The vehicle of claim 21 wherein said steering handle is rotatably mounted on said second frame and is operatively connected to said chain means such that rotation of said steering handle causes simultaneous rotation of said first sprocket means and said steering head shaft to turn said first wheel.

23. The vehicle of claim 22 wherein said steering handle further comprises a midsection pivotally secured to said first frame and handle grips connected to opposite ends of said midsection, said midsection being rigidly connected to second sprocket means which is connected to said chain means such that pivoting movement of said midsection causes simultaneous rotation of said first and second sprocket means and said steering head shaft to turn said first wheel.

24. The vehicle of claim 23 wherein at least one of said first and second sprocket means has an elliptical shape.

25. The vehicle of claim 24 wherein said elliptically shaped sprocket means has a major diameter to minor diameter ratio of approximately 2:1.

26. A two wheel single track vehicle comprising:

a first frame;

a second frame having support structure including a seat for supporting a vehicle operator thereon;

a drive mechanism mounted to said second frame;

said first and second frames pivotally connected together by a pivot connection having a steering axis inclined downwardly and in a longitudinal direction toward said second frame;

a wheel mounted on each of said first and second frames, each wheel having a lowermost point, and wherein said steering axis strikes substantially at a center point of a line extending between the lowermost points of said wheels when said vehicle is standing upright with the wheels in alignment with each other.

27. The vehicle of claim 26 wherein said first frame is a rear frame and said second frame is a front frame, said pivot connection includes a steering head shaft and wherein a center of gravity of said vehicle is disposed forwardly of said steering head shaft.

28. The vehicle of claim 26 wherein said first frame is a front frame and said second frame is a rear frame, said pivot connection includes a steering head shaft and wherein a center of gravity of said vehicle is disposed rearwardly of said steering head shaft.

29. The vehicle of claim 26 wherein said steering axis is disposed in a vertical plane when said vehicle is in an upright position with said wheels aligned with each other, and wherein a pivot connection between said first and second frames allows a lateral shift of said steering axis from said vertical plane and with respect to said second frame which remains upright when one wheel is rotated about said steering axis.

* * * * *